United States Patent [19]

Rhein et al.

[11] Patent Number: 5,270,397

[45] Date of Patent: Dec. 14, 1993

[54] MATERIAL FOR MODIFYING IMPACT RESISTANCE

[75] Inventors: Thomas Rhein, Stadecken-Elsheim; Thomas Suefke, Rossdorf; Reiner Mueller, Biebesheim, all of Fed. Rep. of Germany

[73] Assignee: Röhm GmbH, Darmstadt, Fed. Rep. of Germany

[21] Appl. No.: 904,183

[22] Filed: Jun. 25, 1992

[30] Foreign Application Priority Data

Jun. 29, 1991 [DE] Fed. Rep. of Germany ....... 4121652

[51] Int. Cl.⁵ .................... C08F 265/06; C08L 51/04
[52] U.S. Cl. ..................... 525/309; 525/281; 525/304; 525/902; 525/80
[58] Field of Search ............. 525/304, 309, 902, 281

[56] References Cited

U.S. PATENT DOCUMENTS

| | | | |
|---|---|---|---|
| 3,661,994 | 5/1972 | Hwa et al. | 260/879 |
| 3,808,180 | 4/1974 | Owens | 260/885 |
| 3,843,753 | 10/1974 | Owens | 260/876 R |
| 3,988,392 | 10/1976 | Kameda et al. | 260/876 R |
| 4,110,843 | 8/1978 | Skidmore | 366/83 |
| 4,513,118 | 4/1985 | Suetterlin et al. | 525/81 |
| 4,521,568 | 6/1985 | Mori et al. | 525/309 |

FOREIGN PATENT DOCUMENTS

| | | |
|---|---|---|
| 0040543 | 11/1981 | European Pat. Off. . |
| 2750682 | 5/1978 | Fed. Rep. of Germany . |
| 3300526 | 7/1984 | Fed. Rep. of Germany . |
| 2189440 | 1/1974 | France . |

*Primary Examiner*—Vasu S. Jagannathan

[57] ABSTRACT

An emulsion polymer having at least three phases, adaptable as an agent for modifying the impact resistance of rigid thermoplastic synthetic resins such as polymethyl methacrylate, and consisting of A) a rigid core phase of a crosslinked homo- or copolymer, B) an elastomer phase, prepared in the presence of the core material and having a glass transition temperature not above −10° C., comprising a crosslinked resin which includes an arylalkyl acrylate or arylalkyl methacrylate, and C) a rigid shell phase, prepared in the presence of the elastomer phase, having a glass transition temperature of at least 50° C.

4 Claims, 1 Drawing Sheet

MATERIAL FOR MODIFYING IMPACT RESISTANCE

The present invention relates to multi-stage emulsion polymers primarily adaptable to admixture with rigid and relatively brittle synthetic resins in order to improve the impact resistance properties of the latter. Such polymers are often designated as agents for modifying impact resistance, although they can also be used alone as molding materials for the preparation of impact resistant shaped bodies, films, and the like.

A fundamental requirement of the agents for modifying impact resistance is optical clarity, because only on this condition can an optically clear modified molding material be obtained.

Their basic construction consists of a rigid core, an elastomeric intermediate stage comprising an acrylic ester polymer, and a rigid, non-elastomeric final stage. It is assumed that the polymer of the intermediate stage and of the final stage are arranged in the form of shells around the core.

STATE OF THE ART

Agents for modifying impact resistance prepared by emulsion polymerization from an elastomeric core and a rigid, non-elastomeric shell are known in large number in the prior art. To match the optical refractive index of the rigid phase, the elastomeric phase most often is made from an aromatic vinyl monomer, such as styrene or benzyl acrylate, in addition to acrylic esters (cf. FR-A 2 189 440). In this publication, benzyl acrylate is viewed as technically equivalent to styrene. However since it is considerably more expensive than styrene, it is not used in practice for this purpose. Comparative tests which are reproduced in detail at the end of the present specification have shown that in a two-stage agent for modifying impact resistance having an elastomeric core there is no influence detected o impact resistance when styrene is replaced by benzyl acrylate.

According to U.S. Pat. No. 3,661,994, an improvement of this emulsion polymer is achieved when a rigid core is prepared as the first stage of the emulsion polymer and an elastomeric shell and a rigid shell are created by two subsequent polymerization stages. The elastomeric phase is crosslinked by polyfunctional vinyl monomers.

If the elastomeric phase consists solely of alkyl acrylates and crosslinking monomers, it has, as a rule, a somewhat lower optical index of refraction than the rigid phases of the core and of the final stage. This leads to diffraction of light at the phase boundary surfaces and to the formation of scattered light, which has the consequence that the material appears cloudy to white if it is fused into a coherent mass. In order to avoid this undesired phenomenon, a small amount of styrene is built into the elastomeric phase in order to match the optical index of refraction of the rubbery phase to that of the rigid phase and in this way to avoid a clouding of the material by light scattering at the boundary surfaces of the particles of the rubbery phase.

BRIEF DESCRIPTION OF THE DRAWINGS

FIG. 1 shows the inclusion of a prior art modifying agent in which the elastomeric phase of the intermediate stage of the added particles is not formed as a clearly separated phase, but is present more or less strongly mixed with the material of the core. This is attributed to the swelling of the core with the monomers of the elastomeric phase in the second polymerization stage. Thus, a part of the elastomeric phase is not available in the desired way for the dissipation of energy on impact stress, so that only a limited improvement in notch impact strength is achieved. FIG. 2 shows the inclusion of a modifying agent according to the present invention in which, on the other hand, the elastomer phase and the core phase are quite distinct and more of the elastomer phase is available for dissipation of impact stress, giving improved notch impact strength.

PROBLEM AND SOLUTION

The inventors have set themselves the goal of improving the notch impact strength of emulsion polymers of this kind, especially when cold, and also of assuring optical clarity. They ascribe the indistinct separation of the core phase and of the elastomeric phase in prior art particles t the different reactivities of acrylic esters and styrene in the emulsion polymerization. Styrene cannot be totally avoided because of the necessity of matching the indices of refraction. However, it has now been found that the substitution of an arylalkyl acrylate or methacrylate for styrene accomplishes both the desired matching of the indices of refraction as well as promoting a sharp separation of the core phase and elastomeric phase. This is not only recognizable in electron photomicrographs, but above all in the improvement of the notch impact strength.

Thus, the object of the invention is a material, for modifying the impact resistance of thermoplastic synthetic resins, of a kind which consists of an emulsion polymer having at least three phases, namely A) a rigid core of a homopolymer or copolymer of ethylenically unsaturated free-radically polymerizable monomers;

B) an elastomeric phase, created in the presence of the core material and having a glass transition temperature not above 10 ° C., which is synthesized from
  a) an alkyl ester of acrylic acid having 1 to 8 carbon atoms in the alkyl portion,
  b) at least one crosslinking comonomer having two or more polymerizable double bonds in the molecule, and
  c) at least one ethylenically unsaturated free radically polymerizable monomer having an aromatic group; and C) a rigid phase, prepared in the presence of the elastomeric phase, which is a homopolymer or copolymer of ethylenically unsaturated free radically polymerizable monomers having a glass transition temperature of at least 50° C.

According to the invention, an arylalkyl acrylate or methacrylate is involved in the synthesis of the elastomeric phase as an ethylenically unsaturated free radically polymerizable monomer having an aromatic group. The emulsion polymer advantageously consists of 5 to 40 percent by weight of component A, 25 to 75 percent by weight of component B, and 20 to 60 percent by weight of component C, all components totalling 100 percent by weight.

DETAILED DESCRIPTION OF THE DRAWINGS

Figure 1:
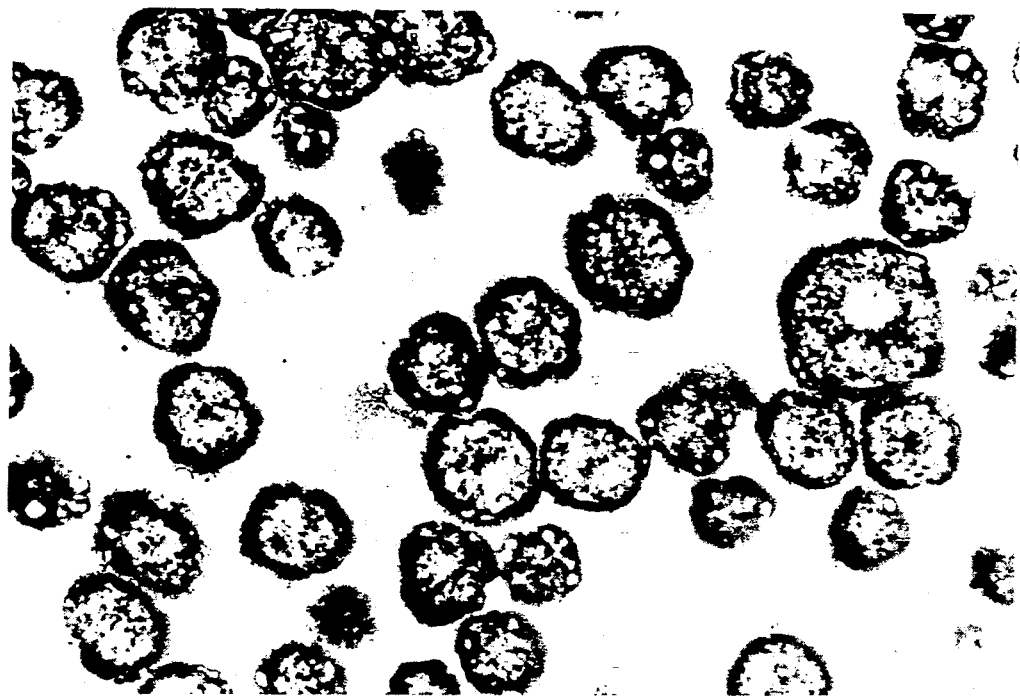
FIGS. 1 and 2 of the accompanying drawings are line drawing reproductions of photographs taken with an electron microscope of molding compounds to which agents modifying impact resistance have been added. More in particular.

FIG. 1 of the accompanying drawings reproduces an electron photomicrograph, in 50,000× magnification, of a section of a commercial polymethyl methacrylate molding compound ("PLEXIGLAS Y7N", Röhm GmbH. Darmstadt, Germany) modified by the addition thereto of spherical latex particles according to the state of the art (the commercial product "PLEXIGLAS ZK6A" Röhm GmbH). The added particles have polymethyl methacrylate as the rigid core and outer shell phase and an intermediate crosslinked elastomer phase, made from butyl acrylate and styrene, having a glass transition temperature of about 20° C. Treatment of the surface of the section with ruthenium tetroxide makes the elastomer phase (dark portions) visible under the microscope. (The third, outer, rigid phase has fused with the polymethyl methacrylate molding compound matrix and is not distinguishable on the photograph.)

It is evident from the drawing that a considerable portion of the (dark) elastomer phase surrounding the (light) core is admixed with the core, a condition attributed—as earlier discussed—to swelling of the first-formed core polymer by the monomers of the elastomer phase prior to their polymerization.

Figure 2:
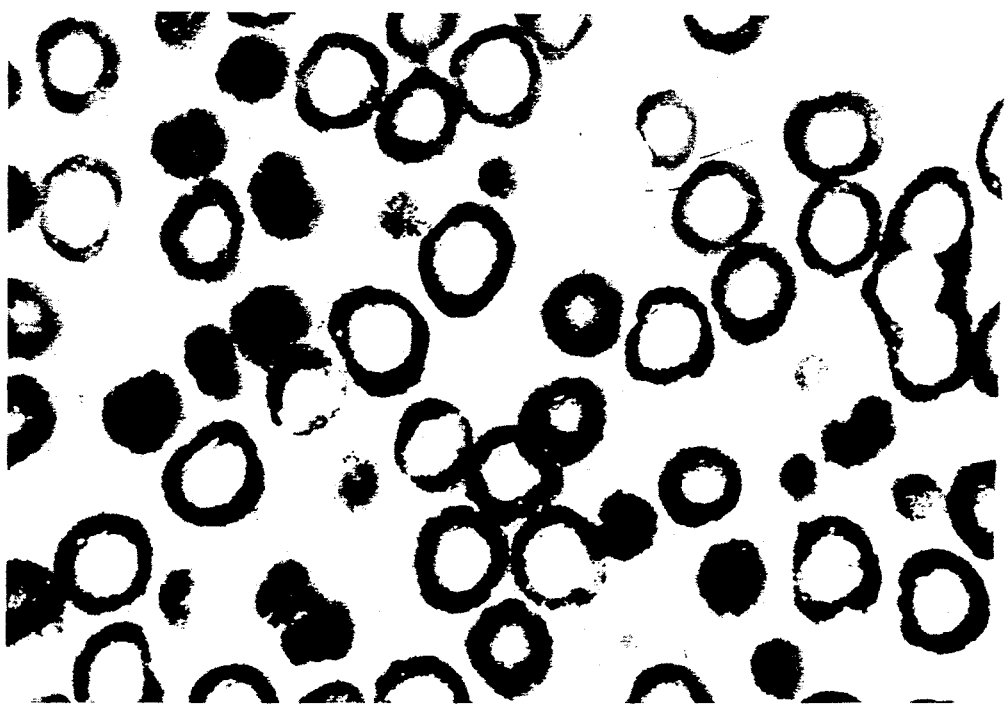

In contrast, FIG. 2 is a ruthenium tetroxide treated section of a polymethyl methacrylate molding compound to which have been added spherical latex particles according to the invention. Specifically, the particles are prepared according to Example 2 of the application and have polymethyl methacrylate as the rigid core and invisible outermost rigid shell phase, with an intermediate elastomer phase made from 72 percent by weight of butyl acrylate, 27 percent by weight of benzyl acrylate, and 1 percent by weight of crosslinking monomers and having a glass transition temperature of −27° C. In contrast to FIG. 1, the elastomeric phase is clearly distinct from the core phase which it surrounds. This property is believed responsible for the improved impact strength of rigid polymers to which the modifying agent according to the invention is added. (The drawing includes particles which are uncut by sectioning or which have only a small slice of the spherical particle removed, rather than being cut diametrically.)

In both cases, the indices of refraction of the rigid and elastomeric phases are matched to one another. The following properties were determined on modified molding compounds which were prepared, respectively, by admixture of a commercial polymethyl methacrylate molding compound ("PLEXIGLAS Y7N", Röhm GmbH) with the emulsion polymers of FIGS. 1 and 2, described above.

TABLE 1

| | Emulsion Polymers | |
|---|---|---|
| | Prior art | Ex. 2 |
| Percent by weight butyl acrylate units in the molding compound | 15 | 14 |
| Vicat softening temperature (ISO 303)* | 98° C. | 97° C. |
| Izod notch impact strength in kJ/m² (ISO 180 1A)* | | |
| at +23° C. | 5.9 | 6.3 |
| at −10° C. | 3.6 | 4.7 |
| at −20° C. | 2.8 | 3.4 |
| Cloudiness (Haze value in percent) | | |
| at +23° C. | 2.3 | 3.6 |

TABLE 1-continued

| | Emulsion Polymers | |
|---|---|---|
| | Prior art | Ex. 2 |
| at +40° C. | 3.1 | 3.4 |

*Test protocol of the International Organization for Standardization, Geneva, Switzerland.

In view of the about-equal glass transition temperatures and the comparable content of butyl acrylate units, the two emulsion polymers can be considered comparable from the point of view of commercial use. This is true also of the values of haze and of white-break (Table 3 infra), which are at a favorable low levels. Products having a haze value below 10, particularly below 6, measured at 23° C. with a haze measuring apparatus like the Hunterlab No. D 29-9, are considered to be optically clear. However, a surprising improvement in notch impact strength is shown for the emulsion polymer according to the invention, particularly in the cold. In the so-called white break properties, i.e. the formation of white places—because of increased light diffusion—upon impact stressing, the molding compounds according to the invention have shown themselves easily superior to the known compounds.

The Emulsion Polymer

An emulsion polymer having at least three phases is the basis of the impact strength modifying agent of the invention, which polymer per se or in admixture with another molding compound can be worked into formed products. The inclusion of further phases to achieve additional effects is possible only to the extent that it does not negate the special advantages of the products according to the invention.

The effect of the arylalkyl esters on the impact resistance is a peculiarity of the emulsion polymer having at least three phases. Comparative tests have shown that the exchange of styrene for benzyl acrylate in two-phased emulsion polymers consisting of an elastomeric core and a rigid shell has no effect on the impact resistance.

The core and the rigid shell of the emulsion polymer consist of rigid polymers which at room temperature are still clearly below their elastic or plastic state. Their glass temperatures are as a rule clearly above 10° C., preferably above 50° C., especially above 70° C. Apart from the fact that the core is optionally crosslinked and the rigid shell is not crosslinked, both polymers may be synthesized from the same or similar ethylenically unsaturated free-radically polymerizable monomers or mixtures thereof. Methyl methacrylate is preferably present in an amount of at least 50 percent by weight or is used alone— in the core optionally together with a crosslinking monomer. As comonomers, lower alkyl acrylates, particularly those having 1 to 7 C-atoms in the alkyl portion can optionally be present up to 30 percent by weight of the core or rigid shell. If the core is crosslinked, the crosslinking monomer as a rule is from 0.1 to 10 percent by weight of the core.

The elastomeric phase is as a rule made up of at least 50, preferably more than 60, percent by weight of alkyl acrylates or methacrylates. The acrylates permit attaining lower glass transition temperatures for the elastomeric phase and are preferred for this reason; Examples are ethyl-, propyl-, n-butyl-, or 2-ethylhexyl acrylate. The amount of the arylalkyl acrylate or methacrylate is chosen at such a value that the optical indices of refraction of the rigid and elastomeric phases are approximated one to another, which is recognizable when the emulsion polymer has a haze value which does not exceed 10. The difference between the refractive indices of the phases is as a rule less than 0.001. Naturally it is a prerequisite that the measured haze is not attributable to causes other than the difference in refractive index between the phases and not, for example, to impurities. An amount of 15 to 45 percent by weight of the arylalkyl acrylate or methacrylate can be necessary for adaptation of the refractive index. Suitable arylalkyl acrylates are, e.g. benzyl-, phenylethyl-, phenylpropyl-, phenylpentyl-, or phenylhexyl acrylate.

Both monomer components (a) and (b) essentially determine the glass transition temperature of the elastomer phase, which is not above $-10°$ C., preferably between $-15°$ C. and $-40°$ C. To the extent that the required glass temperature is achieved, other free-radically polymerizable aliphatic comonomers which can be copolymerized with alkyl acrylates and the arylalkyl acrylate or methacrylates can optionally also be used, as is known according to the state of the art. However, other aromatic comonomers, such as styrene, α-methyl styrene, or vinyl toluene, should be excluded as much as possible.

An essential component of the elastomer phase is a sufficient quantity of crosslinking monomer units. Crosslinking is sufficient if the crosslinked polymer is not essentially swollen by the monomer added during the polymerization of the subsequent stage. A distinction is made here between crosslinkers and graftlinkers. Monomers which have at least two readily copolymerizing groups, e.g. acryl- or methacryl groups, belong to the group of crosslinkers. Monomers which, in addition to an acryl- or methacryl-group, have yet another ethylenically unsaturated group of clearly smaller tendency to polymerize, as a rule an allyl group, are characterized as graftlinkers. For the goal of the invention, an amount of graftlinker in the elastomer phase of at least 0.5 percent, better from 0.8 to 4 percent, by 1 weight of the elastomer phase, is advantageous. However, the graftlinker can be replaced with equally good effect by crosslinking monomers which contain three or more readily copolymerizing groups, e.g. acryl- or methacryl-groups, in the molecule. On the other hand, other crosslinkers have proved superfluous, even although in some cases they are advantageous in an amount from 0.05 to 2 percent by weight of the elastomer phase.

The amount of the graftlinker, or of the crosslinker having three or more ethylenically unsaturated free-radically polymerizable double bonds which can be used in its place, is preferably so chosen within the limits from 0.5 to 5 percent by weight that in the finished emulsion polymer at least 15 percent by weight of the rigid phase is covalently bonded with the elastomer phase. The degree of bonding is evident on dissolving an aliquot amount of the emulsion polymer in a solvent for the rigid phase. In this case, the elastomer phase and the portion of the rigid phase covalently bonded therewith remain undissolved. The weight of the undissolved portion should be greater than the calculated sum of the weights of the core and the elastomer phase of the aliquot sample by at least 15, and preferably 30 to 80, percent by weight of the calculated weight of the rigid phase.

As graftlinkers, the allyl esters of acrylic or methacrylic acid are preferred, but also other graftlinkers mentioned in U.S. Pat. Nos. 3,808,180 and 3,843,753 are suitable. Triallyl cyanurate, trimethylolpropane triacrylate and trimethacrylate, pentaerythritol triacrylate and trimethacrylate, and related compounds, of which further examples are given in DE-A 33 00 526, are crosslinking monomers having three or more ethylenically unsaturated free-radically polymerizable groups.

The three or multiphase emulsion polymer is prepared in an aqueous phase in the usual way by three- or multi-stage emulsion polymerization. In the first stage, the core is created. It should have an average particle size from 100 to 300 nanometers (nm). Methods for adjusting the desired particle size are known to the skilled artisan. Advantageously, control of particle size is according to the seed latex method.

After conclusion of the first polymerization stage, the elastomer phase is prepared in the second polymerization stage in the presence of the core. Finally, in the third stage, after the second polymerization stage is concluded, the final rigid phase is created in the same way in the presence of the emulsion polymer of the second stage.

The emulsion polymerization is suitably carried out in the presence of anionic emulsifiers. Among these are, for example, sulfonates, alkyl sulfosuccinates, and alkoxylated and sulfated paraffins.

As the polymerization initiator, 0.01 to 0.5 percent, for example, by weight of the aqueous phase, of alkali metal or ammonium peroxidisulfates are added and the polymerization is initiated at temperatures from 20° C. to 100° C. Preferably redox systems are used, for example of 0.01 to 0.05 percent by weight of organic hydroperoxides and 0.05 to 0.15 percent by weight of rongalite at temperatures from 20° C. to 80° C. In the polymerization of the rigid phase, as a rule a suitable amount of a chain transfer agent, e.g. of a mercaptan, is used in order to approximate the molecular weight of the rigid phase polymer to that of the molding compound which is to be modified with the three-phase emulsion polymer.

Working up the Emulsion Polymer into Molding Compounds

The emulsion polymer occurs in the form of an aqueous dispersion having a solids content of 30 to 60 percent by weight. The emulsion polymer can be isolated by spray drying, coagulation by freezing, precipitation by the addition of electrolytes, or by mechanical or thermal stressing, such as can be carried out according to DE-A 2 750 682 or U.S. Pat. No. 4,110,843 using a degassing extruder. The spray drying method is the most common, although the other mentioned methods have the advantage that in them the water soluble polymerization auxiliaries are at least partially separated from the polymer.

The material for modifying impact resistance according to the invention acts to improve the impact resistance of rigid thermoplastic synthetic resins which are compatible with the rigid phase, preferably of polymethyl methacrylate. Too, rigid copolymers of methyl methacrylate with acrylic esters, acrylonitrile, or with maleic acid anhydride and styrene, as well as polyvinyl chloride, come under consideration. As a rule, 10 to 60 parts of the material modifying impact resistance are admixed with 100 parts of the molding compound to be modified.

Mixtures of this sort can be prepared in different ways. For example, the dispersion of the emulsion polymer prepared according to the invention can be mixed with an aqueous dispersion of the component to be admixed therewith and the resultant mixture coagulated, the aqueous phase separated, and the coagulate melted into a molding compound. By this process, a particularly uniform mixing of the two compounds can be achieved. The components can also be prepared separately and isolated, mixed in the form of their melts or as powders or granules, and then homogenized in a multi-screw extruder or on a rolling mill.

Appropriate conventional additives can be admixed in each stage of processing. Among them are dyes, pigments, fillers, reinforcing fibers, lubricants, UV-protective agents, etc.

Admixtures of the agent modifying impact resistance, in particular with polymethyl methacrylate, are adaptable, for example, to the preparation of shaped bodies having a wall thickness greater than 1 millimeters (mm), such as extruded webs 1 to 10 mm in thickness, which can readily be stamped and are, for example, useful for the preparation of printable screens for electrical apparatus, or for the preparation of injected shaped bodies of high quality, such as windows for automotive vehicles. Thin films, for example 50 microns thick, can also be prepared therefrom.

In the following Examples, given by way of illustration for a better understanding of the invention and of its many advantages, the following abbreviations are used for the starting materials:

| | |
|---|---|
| MMA | methyl methacrylate |
| BA | n-butyl acrylate |
| EA | ethyl acrylate |
| BzA | benzyl acrylate |
| ALMA | allyl methacrylate |
| PPA | 1-phenyl-propyl-3-acrylate |
| S | styrene |
| BHP | tert.-butyl hydroperoxide |
| PPS | potassium peroxydisulfate |
| EM | emulsifier of tri-isobutylphenol + 6 mols ethylene oxide, sulfated. Na salt |
| RON | Na-hydroxymethyl sulfinate (rongalite) |
| PSN | $C_{15}$-paraffin sulfonate - Na |
| pbw | part(s) by weight |

EXAMPLES 1-3

257 pbw of water, 0.15 pbw of EM, 0.004 pbw of II)sulfate 7 H$_2$O; 109 pbw MMA, and 0.66 pbw ALMA are introduced into a polymerization reactor having a stirring arrangement. The mixture is emulsified by stirring and heated to 50° C. 4.17 pbw of a seed latex containing 30 percent by weight of PMMA, particle size 75 nm ("Nanosizer" measurement), are added to the emulsion. An aqueous solution of 0.05 pbw of PPS and 0.076 pbw of Na disulfite is gradually added for carrying out the polymerization. If the temperature maximum is exceeded, 0.6 pbw of PSN and then 0.26 pbw of Na-disulfite are added.

Over the course of two hours, an emulsion I (cf. Table 2) is then uniformly added for formation of the elastomer phase.

Then 0.16 pbw of RON is added and, in the course of the next two hours, Emulsion II, consisting of 96.7 pbw of water, 216 pbw of MMA, 4.4 pbw of EA, 0.22 pbw of PSN, 0.16 pbw of RON, 0.12 pbw of BHP, and 0.5 pbw of dodecyl mercaptan, is gradually added for formation of the rigid phase. The dispersion obtained is cooled and filtered.

The solid material is isolated from the dispersion by freeze coagulation. For this, the dispersion is cooled to −25° C., then thawed and filtered. The residue is dried at 80° C. In each instance, the elastomer phase has a glass transition temperature less than −10° C., while the rigid shell in each case has a glass transition temperature above 50° C.

For preparing an impact resistant molding compound, the dried emulsion polymer is mixed in an extruder with such an amount of a commercially available PMMA molding compound ("PLEXIGLAS 7", Röhm GmbH) that the content of polymerized butyl acrylate in the total mixture amounts to 14 percent by weight, and then is shaped thermoplastically into the requisite test bodies.

TABLE 2

| | Composition of the Emulsions I: | | |
|---|---|---|---|
| Example No. | 1 | 2 | 3 |
| Water | 96.7 | 96.7 | 96.7 |
| PSN | 0.37 | 0.37 | 0.37 |
| PPS | 0.16 | 0.16 | 0.16 |
| BA | 158 | 158 | 147 |
| BzA | 59.4 | 59.4 | — |
| PPA | — | — | 70.4 |
| ALMA | 2.6 | 2.2 | 2.6 |
| Na disulfite | 0.26 | 0.26 | 0.26 |

In following Table 3, the properties of the impact resistant molding compound are entered. As a comparison, in column V the properties of a molding compound which is obtained in the same way using a commercially available agent for modifying impact resistance ("PLEXIGLAS ZK6A", Röhm GmbH) are given.

TABLE 3

| Example No. | 1 | 2 | 3 | V |
|---|---|---|---|---|
| Vicat Softening Temp. (°C.) after 16 hours at 80° C. | 98 | 97 | 97 | 98 |
| Notch impact strength (Izod) in kJ/m | | | | |
| at +23° C. | 7.0 | 6.8 | 6.2 | 5.9 |
| at −10° C. | 4.7 | 4.7 | 4.7 | 3.6 |
| at −20° C. | — | 3.4 | 3.6 | 2.8 |
| Haze (percent) | | | | |
| at 23° C. | 3.9 | 3.6 | 4.4 | 2.3 |
| at 40° C. | 3.7 | 3.4 | 5.8 | 3.1 |
| White-break after loading | 7 | 8 | 7 | 10 |

Comparison tests with a two-phase emulsion polymer having an elastomeric core, using styrene and benzyl acrylate An aqueous phase of 125 pbw of water and 0.025 pbw of EM is introduced into a stirred vessel and warmed to 80 ° C. After the addition of 0.15 pbw of PPS, Emulsion I is uniformly added over 2.5 hours and then Emulsion II is uniformly added over a further 1.5 hours; their composition is given in Table 4. Then the batch is stirred for 1 hour at 80 ° C., cooled, and filtered. The emulsion polymer is obtained by freeze coagulation as in Examples 1-3 and worked up with PMMA molding compound into test bodies.

TABLE 4

| | Emulsion I Test A | Emulsion I Test B | Emulsion II Tests A + B |
|---|---|---|---|
| Water | 225 | 225 | 150 |
| EM | 0.62 | 0.62 | 0.31 |
| PPS | 0.31 | 0.31 | 0.26 |
| BA | 215.4 | 247.4 | — |
| BzA | 81.0 | — | — |
| S | — | 48.9 | — |

TABLE 4-continued

|  | Emulsion I Test A | Emulsion I Test B | Emulsion II Tests A + B |
| --- | --- | --- | --- |
| MMA | — | — | 196 |
| EA | — | — | 4 |
| ALMA | 3.6 | 3.6 | — |
| Dodecyl mercaptan | — | — | 0.5 |

The properties of the modified PMMA molding compounds according to comparative tests A and B, as well as of a molding compound C prepared according to Example 1 of FR-A 2 189 440, are contrasted in Table 5 with the molding compound of Example 3 according to the invention.

TABLE 5

| Comparison or Example | A | B | C | Ex.3 |
| --- | --- | --- | --- | --- |
| Vicat Softening Temperature (°C.) after 16 hours at 80° C. | 96 | 96 | 98 | 97 |
| Notch impact strength (Izod) in kJ/m | | | | |
| at +23° C. | 3.2 | 3.6 | 4.9 | 7.0 |
| at −10° C. | 1.8 | 1.7 | 2.3 | 4.7 |
| at −20° C. | 1.7 | 1.8 | 1.6 | 3.4 |
| Haze (percent) | | | | |
| at 23° C. | 2.0 | 3.8 | 3.3 | 3.6 |
| at 40° C. | 7.5 | 11.7 | 10.0 | 3.4 |
| White-break after loading | 48.5 | 48.3 | — | 8.0 |

What is claimed is:

1. An agent adaptable to modifying the impact resistance of thermoplastic synthetic resins, which agent is an emulsion polymer having at least three phases and containing A) a rigid core phase of a homopolymer or copolymer of an ethylenically unsaturated free-radically polymerizable monomer or monomers;

B) an elastomer phase, prepared in the presence of the core phase and having a glass transition temperature not above −10° C., consisting essentially of
   a) an alkyl ester of acrylic acid having 1 to 8 carbons atoms in the alkyl portion,
   b) 0.5 to 5 percent by weight of at least one crosslinking comonomer having two or more polymerizable double bonds in the molecule, and
   c) an alkylaryl acrylate or alkylaryl methacrylate, and C) a rigid shell phase, prepared in the presence of the elastomer phase and having a glass transition temperature of at least 50° C., of an homo- or copolymer of ethylenically unsaturated free-radically polymerizable monomers.

2. An agent for modifying impact resistance as in claim 1 wherein said elastomer phase is synthesized from
   a) 85 to 50 percent by weight of an alkyl ester of acrylic acid having 1 to 8 carbon atoms in the alkyl portion,
   b) 0.5 to 5 percent by weight of said crosslinking comonomer or comonomers, and
   c) 15 to 45 percent by weight of said arylalkyl acrylate or methacrylate.

3. An agent for modifying impact resistance as in claim 1 wherein at least one of said rigid core phase and said rigid shell phase consists entirely of polymethyl methacrylate or of a copolymer containing at least 50 percent by weight of methyl methacrylate.

4. An agent for modifying impact resistance as in claim 1 which contains, based on the emulsion polymer,
   A) 5 to 40 percent by weight of said rigid core phase,
   B) 25 to 75 percent by weight of said elastomer phase, and
   C) 20 to 60 percent by weight of said rigid shell phase.

* * * * *

UNITED STATES PATENT AND TRADEMARK OFFICE
CERTIFICATE OF CORRECTION

PATENT NO.  : 5,270,397
DATED       : December 14, 1993
INVENTOR(S) : Rhein et al.

It is certified that error appears in the above-identified patent and that said Letters Patent is hereby corrected as shown below:

Column 2, line 45, replace "10°C" by -- -10°C --.

Column 3, lines 7 and 53, in each line replace "Y7N" by -- 7N --;

line 16, replace "20°C" by -- -20°C --.

Column 7, line 44, replace "II)sulfate" by -- Fe(II)sulfate --.

Column 8, line 7, replace "7" by -- 7N --.

Signed and Sealed this

Twelfth Day of July, 1994

Attest:

BRUCE LEHMAN

*Attesting Officer*     *Commissioner of Patents and Trademarks*